United States Patent
Kim et al.

(10) Patent No.: US 8,265,013 B2
(45) Date of Patent: Sep. 11, 2012

(54) APPARATUS AND METHOD FOR SUPPORTING INTERACTIVE BROADCASTING SERVICE IN BROADBAND WIRELESS ACCESS (BWA) SYSTEM

(75) Inventors: Jun-Hyung Kim, Suwon-si (KR); Nae-Hyun Lim, Yongin-si (KR); Yong Chang, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 922 days.

(21) Appl. No.: 11/845,668

(22) Filed: Aug. 27, 2007

(65) Prior Publication Data
US 2008/0051026 A1    Feb. 28, 2008

(30) Foreign Application Priority Data
Aug. 25, 2006   (KR) ................ 10-2006-0080878

(51) Int. Cl.
*H04W 4/00*    (2009.01)

(52) U.S. Cl. ........ 370/329; 370/401; 370/437; 370/439; 455/3.02; 455/3.05; 455/3.06; 725/65; 725/95; 725/123; 725/136

(58) Field of Classification Search .................. 370/328, 370/401, 437, 439; 455/3.03, 3.04, 3.05; 725/64, 65, 66, 87, 91, 95, 121, 122, 123, 725/136
See application file for complete search history.

(56) References Cited

U.S. PATENT DOCUMENTS

| | | | | |
|---|---|---|---|---|
| 2003/0012223 | A1* | 1/2003 | Chappell et al. | 370/468 |
| 2005/0154599 | A1* | 7/2005 | Kopra et al. | 705/1 |
| 2006/0291662 | A1* | 12/2006 | Takahashi et al. | 380/278 |
| 2007/0026881 | A1* | 2/2007 | Tzavidas et al. | 455/517 |
| 2008/0144568 | A1* | 6/2008 | Usuda et al. | 370/329 |

FOREIGN PATENT DOCUMENTS

| | | |
|---|---|---|
| KR | 1020040024161 | 3/2004 |
| KR | 1020040084062 | 10/2004 |
| KR | 1020060091132 | 8/2006 |

* cited by examiner

*Primary Examiner* — Bo Hui A Zhu
(74) *Attorney, Agent, or Firm* — The Farrell Law Firm, P.C.

(57) ABSTRACT

An apparatus and method for providing an interactive broadcasting service in a Broadband Wireless Access (BWA) system are provided. The method includes receiving content attributes, including a terminal interaction request time index information, and corresponding contents from a content provider; after transmitting the contents to a terminal, sending a burst allocation request message to a Base Station (BS) to allocate an uplink bandwidth to the terminal at the terminal interaction request time; and receiving interactive information from the terminal over the uplink bandwidth allocated to the terminal. The content provider or the service provider can request a response from a plurality of recipients through the MBS service, gather their responses, and reflect the gathered information in the contents.

32 Claims, 6 Drawing Sheets

APPARATUS AND METHOD FOR SUPPORTING INTERACTIVE BROADCASTING SERVICE IN BROADBAND WIRELESS ACCESS (BWA) SYSTEM

PRIORITY

This application claims priority under 35 U.S.C. §119(a) to an application filed in the Korean Intellectual Property Office on Aug. 25, 2006 and assigned Ser. No. 2006-0080878, the contents of which are herein incorporated by reference.

BACKGROUND OF THE INVENTION

1. Field of the Invention

The present invention relates generally to an apparatus and method for providing a Multicast and Broadcast Service (MBS) to a mobile terminal in a Broadband Wireless Access (BWA) system, and in particular, to an apparatus and method for supporting an interactive broadcasting service by receiving information from a plurality of mobile terminals during the broadcasting.

2. Description of the Related Art

In general, communication systems have been developed based on a voice service and are now advancing to providing data service and various multimedia services as well as the voice service. The voice oriented communication systems have not satisfied users' service needs because of their relatively narrow transmission bandwidths and expensive fees. Additionally, advances of the communication industry and users' increasing demand for Internet service raise the necessity for communication systems that efficiently provide Internet service. To respond to this demand, a Broadband Wireless Access (BWA) system is presented with enough broadband to meet the users' increasing demand for an efficiently provided Internet service.

The BWA system integrally supports not only a voice service, but also multimedia application services such as various low- and high-speed data services and high-definition video. The BWA system is a radio communication system capable of accessing a Public Switched Telephone Network (PSTN), a Public Switched Data Network (PSDN), the Internet, an International Mobile Telecommunications (IMT)-2000 network, and an Asynchronous Transfer Mode (ATM) network in a mobile or stationary environment based on radio media using broadbands of 2 GHz, 5 GHz, 26 GHz, and 60 GHz, and supporting a data transfer rate over 2 Megabits per second (Mbps). The BWA system can be classified to a broadband wireless subscriber network, a broadband mobile access network, and a high-speed wireless Local Area Network (LAN) based on the terminal mobility (stationary or mobile), the communication environment (indoor or outdoor), and the channel transfer rate.

The radio access scheme of the BWA system is standardized by Institute of Electrical and Electronics Engineers (IEEE) 802.16 Working Group, which is an international standardization organization.

Compared to a conventional radio technique for the voice service, the IEEE 802.16 standard can transfer much data within a shorter time with the wide data bandwidth and allow all users to efficiently share and utilize the channel (or resource). Also, with Quality of Service (QoS) guaranteed, the users can enjoy services of different qualities according to the service characteristics.

An IEEE 802.16 system has a Multicast and Broadcast Service (MBS) service specification for providing the multicast and the broadcast to a plurality of mobile terminals. The MBS specification can distinguish the same multicast and broadcast service area using different Connection IDentifiers (CIDs) or different Security Associations (SAs). In other words, by means of the CID and the SA, the MBS specification can specify that an MBS zone (MBS_ZONE) is a region where broadcast and multicast service flows are effective. A Base Station (BS) broadcasts MBS_ZONE information using a Downlink Channel Descriptor (DCD) message. Namely, the MBS_ZONE is a BS group using the same CID and SA to transmit contents.

In the mean time, while viewers receive the broadcasting services in the simplex manner in the related art, an interactive service enables to delivery the viewers' opinion or demand to broadcast contents or a content provider and to reflect the gathered viewers' opinion or demand in the broadcast contents. Since the MBS service enables not only the unidirectional downlink broadcasting service but also the bidirectional uplink connection at the same time according to the characteristics of the IEEE 802.16 system, the interactive service can be provided.

As discussed above, to support the MBS, a method needs to be defined to provide the interactive service to the plurality of mobile terminals.

SUMMARY OF THE INVENTION

An aspect of the present invention is to substantially solve at least the above problems and/or disadvantages and to provide at least the advantages below. Accordingly, an aspect of the present invention is to provide an apparatus and method for providing an interactive broadcasting service in a Broadband Wireless Access (BWA) system.

Another aspect of the present invention is to provide an apparatus and method for providing an interactive broadcasting service to a mobile terminal using an Multicast Broadcast Service (MBS) system in a BWA system.

The above aspects are achieved by providing an interactive broadcasting service providing method of an MBS controller in a BWA communication system, which includes receiving content attributes, including a terminal interaction request time index information, and corresponding contents from a content provider; after transmitting the contents to a terminal, sending a burst allocation request message to a BS to allocate an uplink bandwidth to the terminal at a terminal interaction request time; and receiving interactive information from the terminal over the uplink bandwidth allocated to the terminal.

According to one aspect of the present invention, an interactive broadcasting service receiving method of a terminal in a BWA system, includes receiving contents which request an interactive information transfer at a specific time from an MBS controller; when the interactive information transfer is requested at the corresponding time while the contents are received, automatically allocating an uplink bandwidth from a BS; and transmitting interactive information to the MBS controller over the allocated uplink bandwidth.

According to the aspect of the present invention, an interactive broadcasting service providing method of a BS in a BWA system includes receiving a burst allocation request message which requests uplink bandwidth allocation, from an MBS controller to receive interactive information from a terminal at a specific time; allocating an uplink bandwidth to the terminal at the corresponding time; and sending a burst allocation response message to the MBS controller.

According to the aspect of the present invention, an interactive broadcasting service providing apparatus of a BWA system includes an MBS controller for transmitting contents to a terminal, allocating an uplink bandwidth to the terminal by sending a burst allocation request message to a BS at a terminal interaction request time, and receiving interactive information from the terminal over the allocated uplink bandwidth; the terminal for receiving the contents from the MBS controller, allocating an uplink bandwidth from the BS at the terminal interaction request time, and sending the interactive information to the MBS controller over the allocated uplink bandwidth; and the BS for allocating the uplink bandwidth to the terminal when the burst allocation request message for the terminal is received from the MBS controller.

According to the aspect of the present invention, an interactive broadcasting service providing method of a content provider in a BWA system includes generating MBS contents; and transmitting content attributes, including a terminal interaction request time index relating to the generated contents, to an MBS controller.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides an apparatus and method for providing an interactive broadcasting service in a Broadband Wireless Access (BWA) system.

Figure 1:
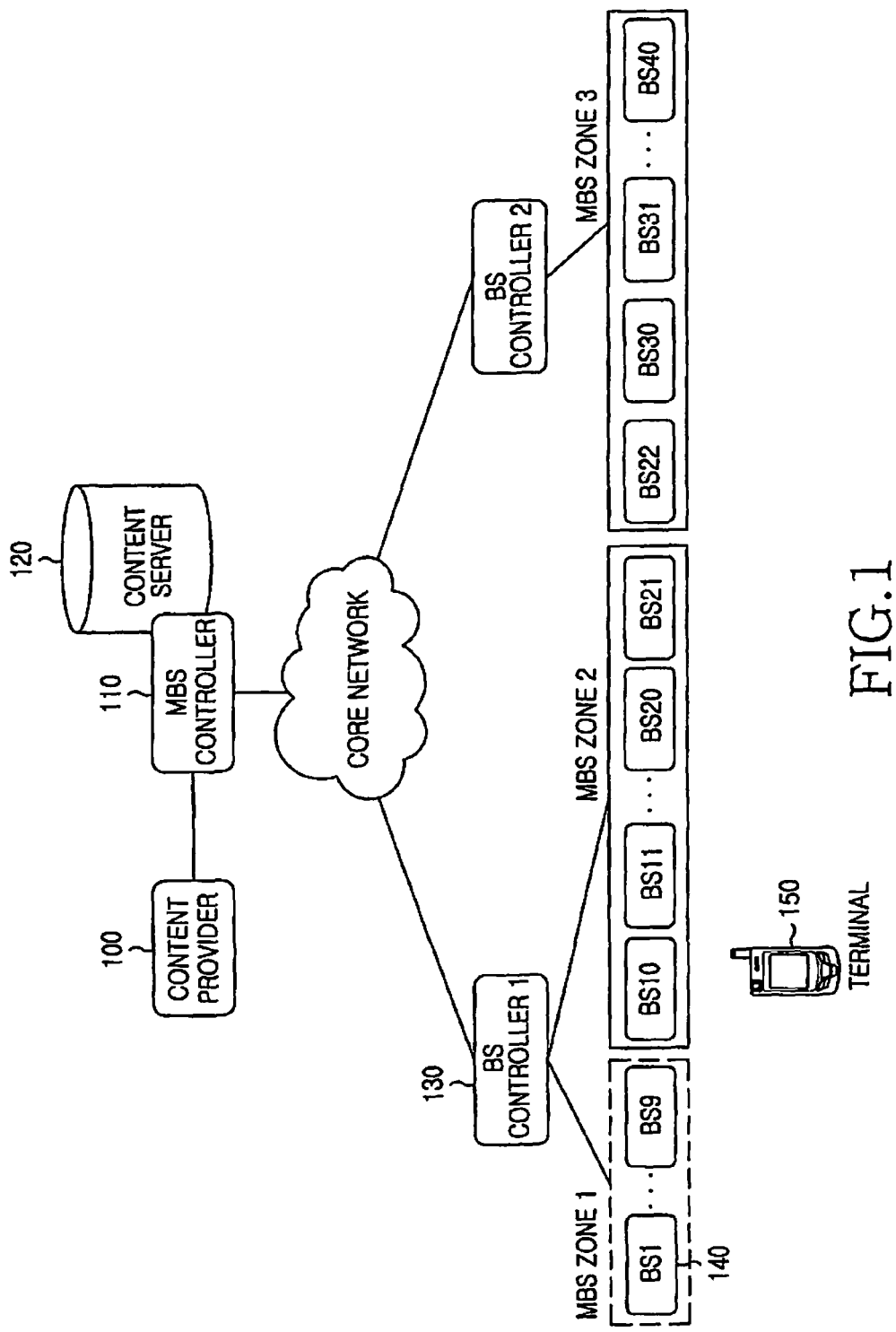
FIG. 1 illustrates a network structure for providing an interactive broadcasting service according to the present invention.

FIG. 1 illustrates a network structure for providing an interactive broadcasting service according to the present invention. The network structure includes a content provider 100, a Multicast and Broadcast Service (MBS) controller 110, a content server 120, a Base Station (BS) controller 130, a BS 140, and a terminal 150.

The content provider 100 of FIG. 1 generates and provides content for the broadcasting service to the MBS controller 110. The MBS controller 110 stores the content provided from the content provider 100 to the content server 120. The MBS controller 110 receives the corresponding contents from the content server 120 according to a broadcasting program and transmits the contents to the terminal 150 via the BS controller 130 and the BS 140. The BS controller 130 receives the broadcasting service from the MBS controller 110 and forwards the received broadcasting service to the BS 140. The BS 140 wirelessly communicates with the terminal 150 and forwards the contents from the BS controller 130 to the terminal 150. As shown in FIG. 1, an MBS zone includes a plurality of BSs, and BSs belonging to the same MBS zone send the same broadcasting signal at the same time.

Figure 2:
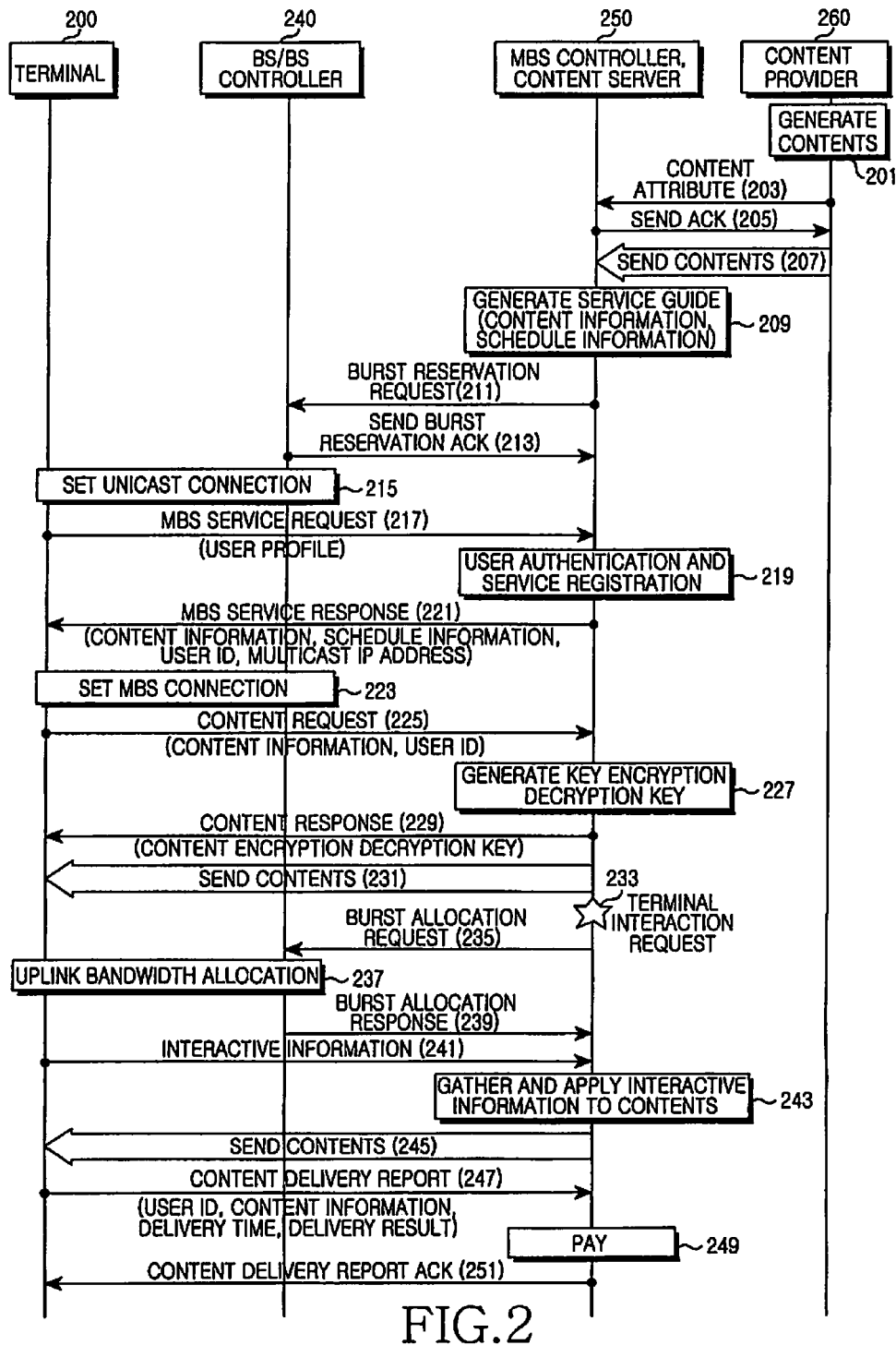
FIG. 2 illustrates a method for providing the interactive broadcasting service in a BWA system according to the present invention.

FIG. 2 illustrates a method for providing the interactive broadcasting service in a BWA system according to the present invention.

In FIG. 2, a content provider 260 generates MBS contents in step 201 and transmits content attributes to an MBS controller 250 in step 203. The content attributes include content encoding information, a file size, content provider information, and a index indicative of a time for requesting the interaction during the broadcasting. The contents of the attributes, including the index indicative of the time for requesting the interaction during the broadcasting, are referred to as interactive contents.

Upon receiving the content attributes, the MBS controller 250 sends a content transfer ACKnowledge (ACK) message allowing the content transfer to the content provider 260 in step 205. Upon receiving the content transfer ACK message, the content provider 260 transmits the MBS contents to the MBS controller 250 in step 207. At this time, the MBS controller 250 stores the received MBS contents to a content server 250.

Next, the MBS controller 250 generates a service guide using the received content attributes in step 209. In step 211, by taking into account a time and a transfer rate required for the MBS based on the service guide, the MBS controller 250 requests the allocation of downlink frame burst for the MBS by sending a burst reservation request message to a BS/BS controller 240. Herein, the service guide includes a broadcasting program, the broadcasting program includes content information and schedule information (start time/end time), and the burst reservation request message includes an MBS burst frame offset, a next MBS frame offset, and a start frame. If necessary, the burst reservation request message further includes period information.

Upon receiving the burst reservation request message, the BS/BS controller 240 allocates an MBS traffic transmission interval according to the request and sends a burst reservation ACK message to the MBS controller 250 in step 213. That is, the BS/BS controller 240 reserves the requested burst and sends the reservation completion message. Next, the BS/BS controller 240 sets a unicast connection with a terminal 200 in step 215.

The terminal 200 sends an MBS service request message to the MBS controller 250 using the established unicast connection in step 217. The MBS service request message includes user profile information. Receiving the MBS service request message, the MBS controller 250 performs a user authentication to check whether the terminal 200 is the user authorized for the service, and performs a service registration to store the user information to its database to provide the MBS service to the terminal 200 when the service authentication is completed in step 219. Next, the MBS controller 250 sends an MBS service response message to the terminal 200 in step 221. The MBS service response message includes broadcasting information provided in the corresponding MBS zone, and the broadcasting information contains the service guide including the content information and the schedule information, an MBS user IDentification (ID), and a multicast Internet Protocol (IP) address mapped to the channel.

The terminal 200, receiving the message, establishes an MBS connection with the BS/BS controller 240 for receiving the MBS traffic in step 223, and sends a content request message to the MBS controller 250 in step 225. The content request message includes content information to be received, and user ID.

The MBS controller 250 generates a content protection key for an encryption and a decryption of the MBS contents in step 227, and sends a content response message including the generated content protection key to the terminal 200 in step 229. Next, the MBS controller 250 transmits the interactive contents stored in the content server 250 to the terminal 200 in step 231. At a specific time during the broadcasting, the interactive contents request a response from the terminal 200. For instance, when specific interactive content may generate a user's terminal interaction request to select a favorite music file at a specific time during the music broadcasting, the terminal 200 can send a response to the MBS controller 250 by selecting the user's intended music through user's key manipulation. The MBS controller 250 can learn when the terminal interaction is requested, based on the index specifying the interaction request time during the broadcasting.

Next, at the time of the interaction request from the terminal 200 in step 233, the MBS controller 250 sends a burst allocation request message to the BS/BS controller 240 to aid the response of the terminal 200 in step 235. That is, the MBS controller 250 requests the burst allocation of the terminal 200 to the BS/BS controller 240 so that the terminal 200 can send uplink packets to the MBS controller 250. If this procedure is not carried out, the terminal 200 needs to perform a separate bandwidth request ranging procedure for the uplink bandwidth allocation, which causes a significant time delay.

Upon receiving the burst allocation request message, the BS/BS controller 240 allocates the uplink burst through an uplink bandwidth (BW) allocation process with the terminal 200 so that the terminal 1200 can send packets to the MBS controller 250 in step 237. Hence, the terminal 200 assigned the uplink bandwidth can transfer the interactive message to the MBS controller 250 without the separate bandwidth request ranging procedure. Next, the BS/BS controller 240 informs the MBS controller 250 of the burst allocation completion by sending a burst allocation response message to the MBS controller 250 in step 239. The terminal 200, which is assigned the uplink bandwidth, sends an interactive message including the interactive information to the MBS controller 250 in step 241.

In step 243, the MBS controller 250 gathers the interactive information through the interactive message of the terminal 200 and applies the gathered information to the corresponding contents according to the content characteristics. In step 245, the MBS controller 250 transmits the contents reflecting the gathered information or separate contents using the gathered information to the terminal 200.

Upon completely receiving the contents, the terminal 200 sends a content delivery report message to the MBS controller 250 in step 247. The content delivery report message includes charging data. For example, the charging data includes a user IDentification (ID), delivered content information, a broadcasting delivery duration, and broadcasting delivery results. If a part of the received contents is not normally received, the terminal 200 can request a retransmission of the corresponding contents to the MBS controller 250 by sending the broadcast delivery results.

Next, the MBS controller 250 pays for the MBS service based on the information in the message in step 249, and sends a content delivery report ACK message to the terminal 200 to inform of the content delivery completion in step 251.

Figure 3:
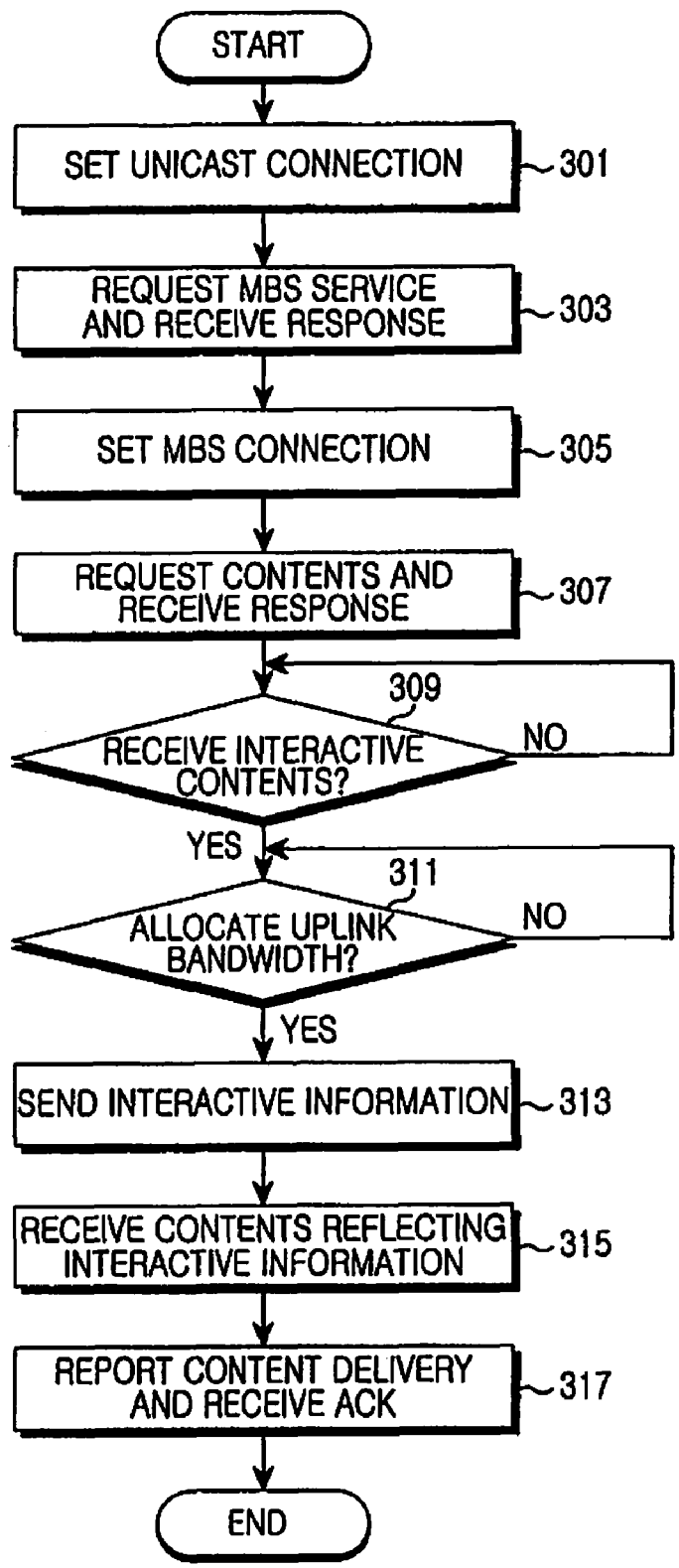
FIG. 3 illustrates an interactive MBS service reception method of a terminal in the BWA system according to the present invention.

FIG. 3 illustrates an interactive MBS service reception method of the terminal in the BWA system according to the present invention.

In FIG. 3, the terminal 200 sets the unicast connection with the BS/BS controller 240 in step 301. In step 303, the terminal 200 sends the MBS service request message to the MBS controller 250 using the unicast connection and receives the MBS service response message from the MBS controller 250. The MBS service request message requests the registration of the MBS service so that the terminal 200 can receive the MBS service provided in the corresponding MBS zone. The MBS service request message includes user profile information. The MBS service response message includes MBS information provided in the corresponding MBS zone, and the MBS information includes the content information, the schedule information, the MBS user ID, and the multicast IP address mapped to the channel.

Next, the terminal 200 sets the MBS connection with the BS/BS controller 240 for the MBS traffic delivery in step 305. The MBS connection is established as follows. The terminal 200 sends a Dynamic Service Addition (DSA) request message including the multicast IP address to the BS/BS controller 240 to obtain a multicast Connection IDentifier (CID) of the corresponding channel. The BS/BS controller 240, which manages a mapping table of the multicast IP addresses and the multicast CIDs, sends a DSA response message including the multicast CID mapped to the multicast IP address received from the terminal 200, to the terminal 200. Accordingly, the MBS connection is established.

Next, the terminal 200 requests an MBS content delivery by sending a content request message to the MBS controller 250, and receives a content response message from the MBS controller 250 in step 307. The communications between the terminal 200 and the MBS controller 250 are conducted through an application signaling. The content request message includes the content information and the user ID. The content response message includes the encryption decryption key of the MBS contents; i.e., the content protection key.

In step 309, the terminal 200 checks whether interactive contents are received from the MBS controller 250. When the interactive contents are received, the terminal 200 checks whether an uplink bandwidth is allocated in step 311. The terminal 200 can receive requests to respond through the interactive contents at a specific time while the terminal 200 receives and broadcasts the interactive contents. At this time, the terminal 200 can send an interactive message to the MBS controller 250 by allocating the uplink bandwidth from the BS/BS controller 240, without a separate bandwidth request ranging procedure. When the uplink bandwidth is allocated, the terminal 200 transmits interactive information to the MBS controller 250 in step 313 and receives the contents reflecting the interactive information from the MBS controller 250 in step 315.

Next, the terminal 200 sends a content delivery report message to the MBS controller 250 and receives a content delivery ACK message in response to the content delivery report from the MBS controller 250 in step 317. The content delivery report message includes the charging data. For example, the charging data includes the user ID, the content information, the delivery duration, and the delivery results.

The terminal 200 the terminates this process

Figure 4:
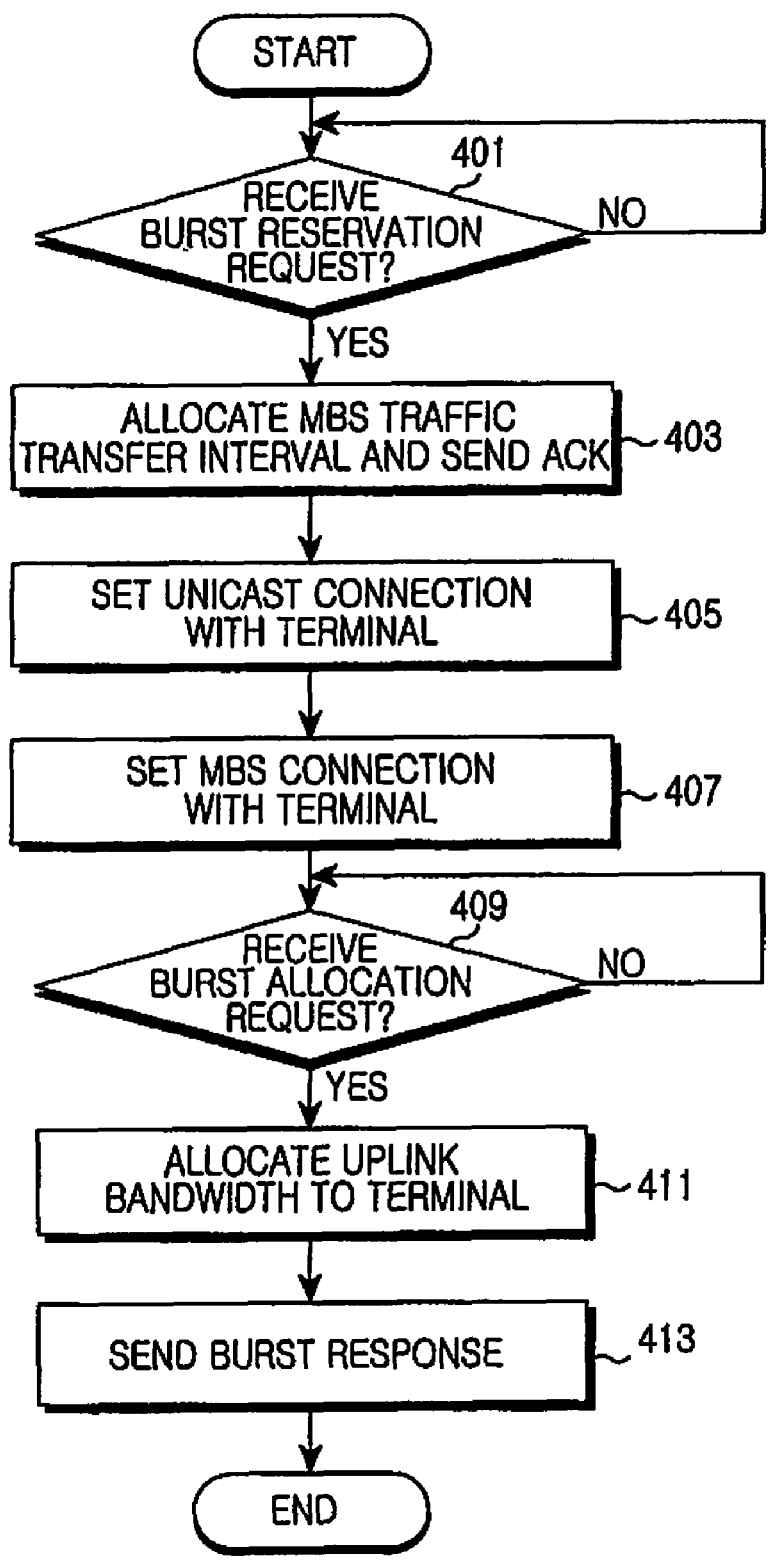
FIG. 4 illustrates an interactive MBS service providing method of a Base Station (BS)/BS controller in the BWA system according to the present invention.

FIG. 4 illustrates an interactive MBS service providing method of the BS/BS controller in the BWA system according to the present invention.

In FIG. 4, the BS/BS controller 240 checks whether a burst reservation request message is received from the MBS controller 250 in step 401. The burst reservation request message includes the MBS burst frame offset, the next MBS frame offset, and the start frame, and the period information if necessary.

Upon receiving the burst reservation request message, the BS/BS controller 240 allocates a transmit interval for the MBS traffic, as requested, and informs the MBS controller 250 of the successful reservation of the requested interval by sending a burst reservation ACK message to the MBS controller 250 in step 403.

The BS/BS controller 240 sets the unicast connection with the terminal 200 in step 405 and sets the MBS connection with the terminal 200 in step 407.

Next, the BS/BS controller 240 examines whether a burst allocation request message is received from the MBS controller 250 in step 409. When receiving the burst allocation request message, the BS/BS controller 240 performs the uplink BW allocation procedure to allocate the uplink burst to the terminal 200 so that the terminal 200 can transfer packets to the MBS controller 250 in step 411. In step 413, the BS/BS controller 240 informs the MBS controller 250 of the burst allocation completion by sending a burst allocation response message to the MBS controller 250.

The BS/BS controller 240 the terminates this process.

Figure 5:
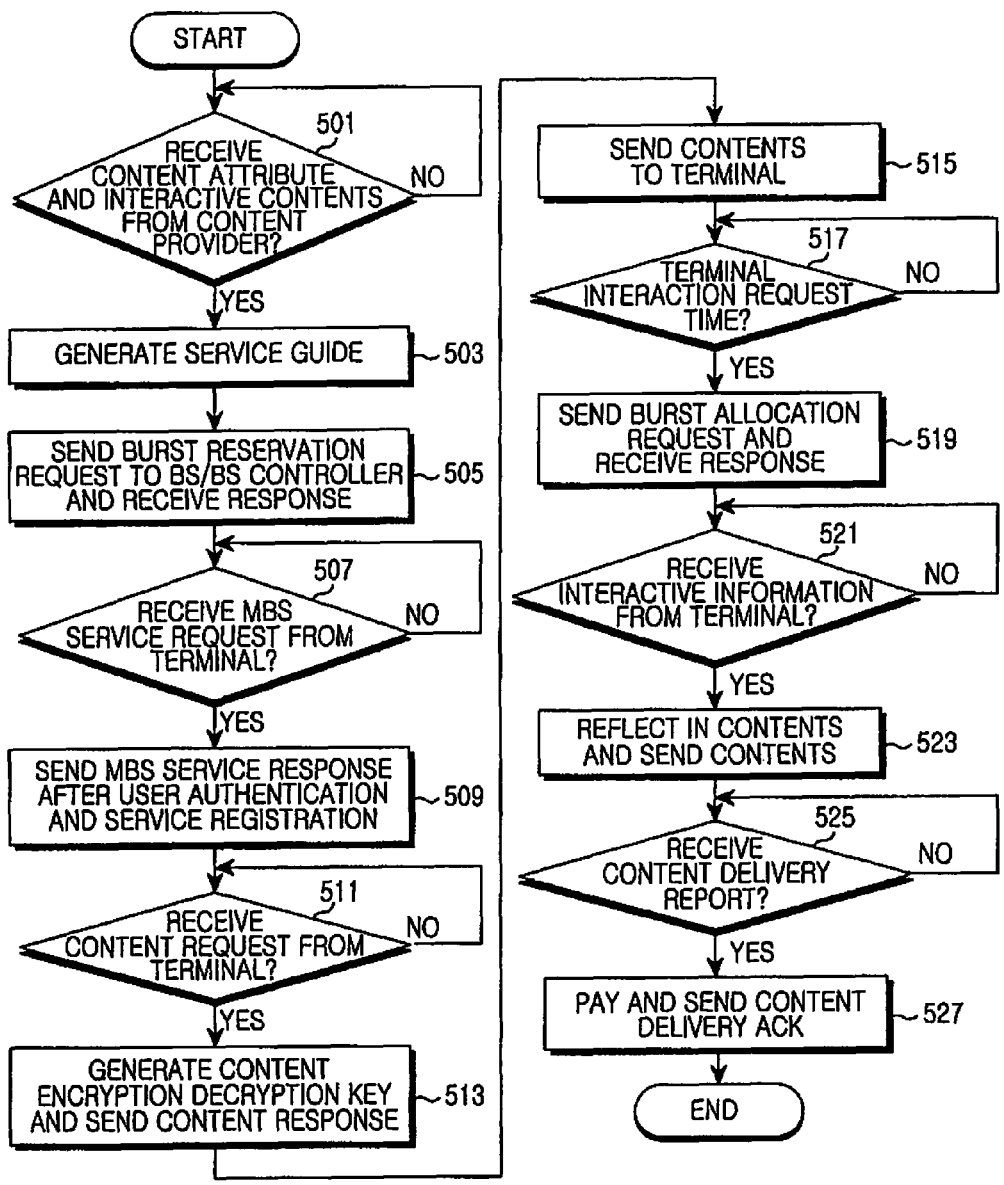
FIG. 5 illustrates an interactive MBS service providing method of an MBS controller in the BWA system according to the present invention.

FIG. 5 illustrates an interactive MBS service providing method of the MBS controller in the BWA system according to the present invention.

In FIG. 5, the MBS controller 250 checks whether content attributes and interactive contents are received from the content provider 260 in step 501. The content attributes include the content encoding information, the file size, the content provider information, and the index indicative of the interaction request time during the broadcasting.

Upon receiving the content attributes and the interactive contents, the MBS controller 250 stores the received MBS contents to the server 250, and generates a service guide using the received content attributes in step 503. The service guide includes the broadcasting program. The broadcasting program includes the content information and the schedule information (start time/end time).

In step 505, the MBS controller 250 requests allocation of a downlink frame burst for the MBS by sending a burst reservation request message to the BS/BS controller 240 by taking into account the time and the data rate required for the broadcasting, based on the service guide, and receives a burst reservation ACK message from the BS/BS controller 240. The burst reservation request message includes the MBS burst frame offset, the next MBS frame offset, and the start frame, and the period information if necessary.

Next, the MBS controller 250 checks whether an MBS service request message is received from the terminal 200 in step 507. The MBS service request message includes the user profile information. When receiving the MBS service request message, the MBS controller 250 performs the user authentication procedure to check whether the terminal 200 is a service authorized user, performs the service registration procedure to store the user information to the database to provide the MBS service to the terminal 200 when the user authentication is completed, and then sends an MBS service response message to the terminal 200 in step 509. The MBS service response message includes the MBS information provided in the corresponding MBS zone. The MBS information contains the service guide including content information and the schedule information, the MBS user ID, and the multicast IP address mapped to the channel.

In step 511, the MBS controller 250 checks whether a content request message is received from the terminal 200. The content request message includes the content information to be received, and the user ID.

Upon receiving the content request message, the MBS controller 250 generates the content protection key for the encryption and decryption of the MBS contents; that is, the encryption decryption key, and sends a content response message including the content protection key to the terminal 200 in step 513. Next, the MBS controller 250 transmits the interactive contents stored in the content server 250 to the terminal 200 in step 515. At a specific time during the broadcasting, the interactive contents request a response from the terminal 200. From the index indicative of the interaction request time in the broadcasting, the MBS controller 250 can learn when the terminal interaction request is generated.

The MBS controller 250 checks whether it is the terminal interaction request time in step 517. At the terminal interaction request time, the MBS controller 250 sends a burst allocation request message to the BS/BS controller 240 to aid the response of the terminal 200 and receives a burst allocation response message from the BS/BS controller 240 in step 519. The burst allocation request message is transferred to allocate the burst in advance so that the terminal 200 can send the uplink packet. If this procedure is not carried out, a there is a significantly longer delay, because the terminal 200 needs the bandwidth request ranging procedure for the uplink bandwidth allocation.

Next, the MBS controller 250 checks whether an interactive message including the interactive information is received from the terminal 200 in step 521. Upon receiving the interactive message, the MBS controller 250 reflects the received information in the corresponding contents according to the characteristics of the contents, and transmits the contents reflecting the gathered 4information or separate contents using the gathered information to the terminal 200 in step 523.

The MBS controller 250 checks whether a content delivery report message is received from the terminal 200 in step 525. When receiving the content delivery report message, the MBS controller 250 pays for the MBS service based on the information of the message and sends a content delivery ACK message to the terminal 200 in step 527. The content delivery report message includes the charging data. For example, the charging data contains the user ID, the delivered content information, the broadcasting delivery duration, and the broadcasting delivery results. If the content retransmission is requested from the terminal 200 through the broadcasting delivery results, the MBS controller 250 can retransmit the corresponding contents to the terminal 200.

Next, the MBS controller 250 then finishes this process.

Figure 6:
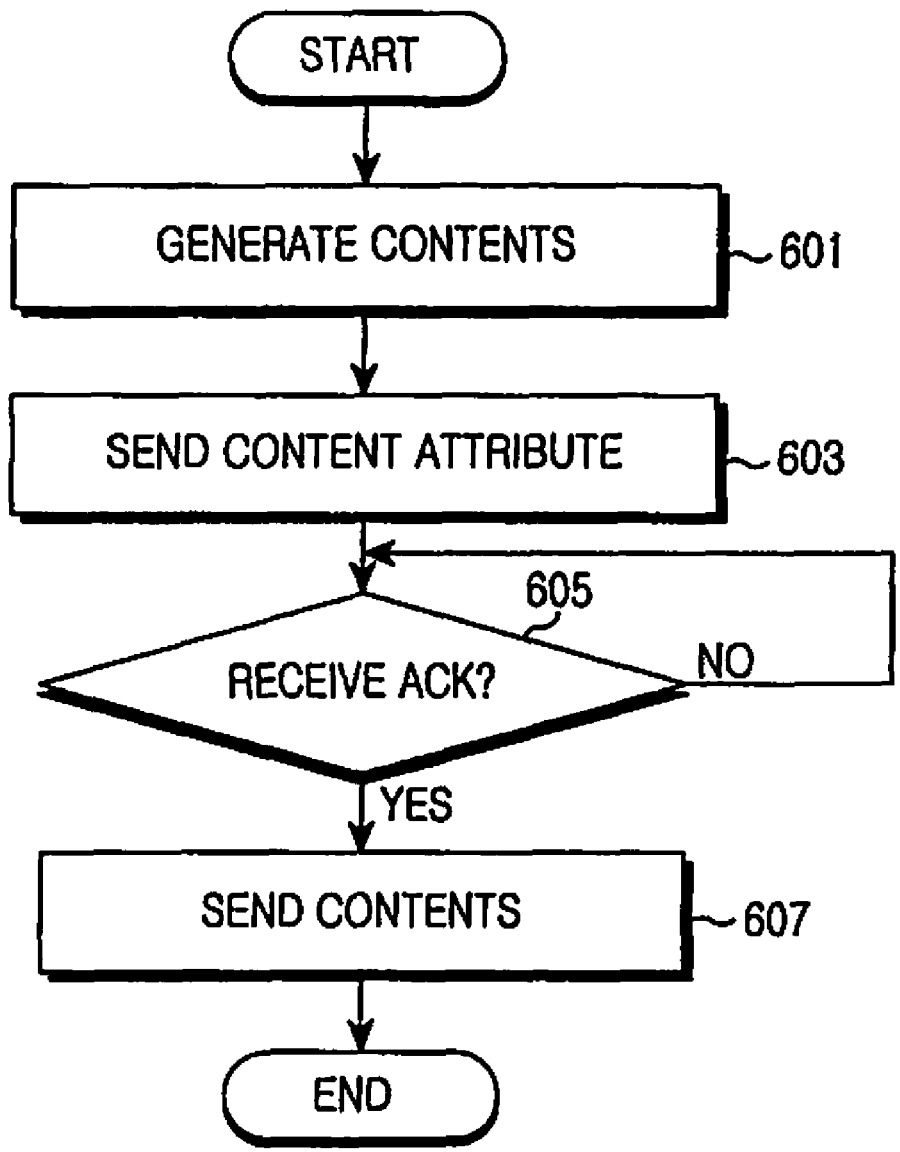
FIG. 6 illustrates an interactive MBS service providing method of a content provider in the BWA system according to the present invention.

FIG. 6 illustrates an interactive MBS service providing method of the content provider in the BWA system according to the present invention.

In FIG. 6, the content provider 260 generates MBS contents in step 601, and sends content attributes to the MBS controller 250 in step 603. The content attributes include the content encoding information, the file size, the content provider information, and the index indicative of the interaction request time during the broadcasting.

Next, the content provider 260 checks whether a content transfer ACK message is received from the MBS controller 250 in step 605. Upon receiving the content transfer ACK message, the content provider 260 transmits the MBS contents to the MBS controller 250 in step 607. The content provider 260 the finishes this process.

As set forth above, the apparatus and method for providing the interactive MBS service to the mobile terminal using the MBS system in the BWA system enable the content provider or the service provider to request responses from the plurality of recipients using the MBS service, to gather their responses, and to reflect the gathered information in the contents. Therefore, the broadcasting with viewer participation, which is attempted in various ways, can be promoted.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An interactive broadcasting service providing method of a Multicast and Broadcast Service (MBS) controller in a wireless communication system, the method comprising:
   receiving content attributes, including terminal interaction request time index information, and corresponding contents from a content provider, wherein the terminal interaction request time index information indicates a terminal interaction request time for requesting terminal interaction for the corresponding contents;
   after transmitting the contents to a terminal, sending a burst allocation request message to a Base Station (BS), at the terminal interaction request time, to allocate an uplink bandwidth to the terminal for reception of interactive information at the MBS controller; and
   receiving interactive information from the terminal over the uplink bandwidth allocated to the terminal;
   wherein content information or schedule information is generated and transmitted to the terminal by the MBS controller using the terminal interaction request time index information received from the content provider.

2. The interactive broadcasting service providing method of claim 1, further comprising:
   receiving a burst allocation response message from the BS.

3. The interactive broadcasting service providing method of claim 1, further comprising:
   transmitting the contents to the terminal by reflecting the received interactive information.

4. The interactive broadcasting service providing method of claim 1, further comprising, before transmitting the contents to the terminal:
   when receiving an MBS service request message from the terminal, performing a user authentication and a service registration and sending an MBS service response message to the terminal;
   when receiving a content request message from the terminal, generating a content protection key for an encryption and a decryption of MBS contents; and
   sending a content response message including the generated content protection key to the terminal.

5. The interactive broadcasting service providing method of claim 4, wherein the MBS service request message includes user profile information.

6. The interactive broadcasting service providing method of claim 4, wherein the content request message includes at least one of the content information and a user IDentification (ID).

7. The interactive broadcasting service providing method of claim 1, wherein the content attributes include at least one of content encoding information, a file size, content provider information, and an interaction request time index.

8. The interactive broadcasting service providing method of claim 4, wherein the MBS service response message includes at least one of the content information, the schedule information, an MBS user ID, and a multicast Internet Protocol (IP) address mapped to a channel.

9. The interactive broadcasting service providing method of claim 8, further comprising, before performing the user authentication and the service registration and sending the MBS service response message to the terminal:
   when receiving the content attributes and the contents from the content provider, generating the content information and the schedule information using the received content attributes; and
   generating a burst reservation request message to allocate a downlink frame burst to the terminal using the generated information and sending the burst reservation request message to the BS.

10. The interactive broadcasting service providing method of claim 9, wherein the burst reservation request message includes at least one of an MBS burst frame offset, a next MBS frame offset, and a start offset, and period information.

11. The interactive broadcasting service providing method of claim 1, further comprising:
    when receiving a content delivery report message from the terminal, paying for an MBS service based on charging data of the content delivery report message and sending a content delivery ACKnowledge (ACK) message to the terminal.

12. The interactive broadcasting service providing method of claim 11, wherein the charging data includes at least one of a user ID, the content information, a delivery duration, and delivery results.

13. An interactive broadcasting service receiving method of a terminal in a wireless system, the method comprising:
    receiving contents which request an interactive information transfer from a network;
    receiving an allocation of an uplink bandwidth, at a terminal interaction request time for the contents, for transmission of interactive information, wherein the terminal interaction request time indicates a time for requesting terminal interaction for the contents; and
    transmitting interactive information to the network over the allocated uplink bandwidth;
    wherein content information or schedule information is generated and transmitted to the terminal by the network using terminal interaction request time index information received from a content provider; and
    wherein the terminal interaction request time index information indicates the terminal interaction request time for requesting terminal interaction for the contents.

14. The interactive broadcasting service receiving method of claim 13, further comprising:
    receiving contents which reflects the interactive information from the network.

15. The interactive broadcasting service receiving method of claim 13, further comprising, before receiving the contents from a second node of the network:
    after establishing a unicast connection with a first node of the network, sending an MBS service request message to the second node of the network and receiving an MBS service response message from the second node of the network; and
    after establishing an MBS connection with the first node of the network using information included in the MBS service response message, sending a content request message including information relating to contents selected by a user, to the second node of the network and receiving a content response message from the second node of the network.

16. The interactive broadcasting service receiving method of claim 15, wherein the MBS service request message includes user profile information.

17. The interactive broadcasting service receiving method of claim 15, wherein the MBS service response message includes at least one of the content information, the schedule information, an MBS user IDentification (ID), and a multicast IP address mapped to a channel.

18. The interactive broadcasting service receiving method of claim 15, wherein the content request message includes at least one of the content information and a user ID.

19. The interactive broadcasting service receiving method of claim 15, wherein the content response message includes a content protection key for an encryption and a decryption of MBS contents.

20. The interactive broadcasting service receiving method of claim 13, further comprising:
sending a content delivery report message including charging data to the second node of the network and receiving a content delivery ACK message from the second node of the network.

21. The interactive broadcasting service receiving method of claim 20, wherein the charging data includes at least one of a user ID, content information, a delivery duration, and delivery results.

22. An interactive broadcasting service providing method of a Base Station (BS) in a wireless system, the method comprising:
receiving a burst allocation request message, at a terminal interaction request time, which requests uplink bandwidth allocation, from a Multicast and Broadcast Service (MBS) controller to receive interactive information from a terminal, wherein the terminal interaction request time indicates a time for requesting terminal interaction for corresponding contents;
allocating an uplink bandwidth to the terminal at the terminal interaction request time; and
sending a burst allocation response message to the MBS controller;
wherein content information or schedule information is generated and transmitted to the terminal by the MBS controller using terminal interaction request time index information received from a content provider, and
wherein the terminal interaction request time index information indicates the terminal interaction request time for requesting terminal interaction for the corresponding contents.

23. The interactive broadcasting service providing method of claim 22, before receiving the burst allocation request message, further comprising:
establishing an MBS connection with the terminal.

24. An interactive broadcasting service providing apparatus of a wireless system, comprising:
a Multicast and Broadcast Service (MBS) controller for receiving content attributes, including terminal interaction request time index information, and corresponding contents from a content provider, transmitting the contents to a terminal, allocating an uplink bandwidth for reception of interactive information to the terminal by sending a burst allocation request message to a Base Station (BS) at a terminal interaction request time, and receiving interactive information from the terminal over the allocated uplink bandwidth, wherein the terminal interaction request time index information indicates the terminal interaction request time for requesting terminal interaction for corresponding contents;
the terminal for receiving the contents from the MBS controller, allocating an uplink bandwidth from the BS at the terminal interaction request time, and sending the interactive information to the MBS controller over the allocated uplink bandwidth; and
the BS for allocating the uplink bandwidth to the terminal when the burst allocation request message for the terminal is received from the MBS controller;
wherein content information or schedule information is generated and transmitted to the terminal by the MBS controller using the terminal interaction request time index information received from a content provider.

25. The interactive broadcasting service providing apparatus of claim 24, wherein the MBS controller transmits the contents to the terminal by reflecting the received interactive information in the contents.

26. The interactive broadcasting service providing apparatus of claim 24, further comprising:
a content provider for generating the contents and providing content attributes, including a terminal interaction request time index, and the contents to the MBS controller.

27. The interactive broadcasting service providing apparatus of claim 26, wherein the MBS controller generates a service guide using the content attributes and transmits the generated service guide to the terminal.

28. The interactive broadcasting service providing apparatus of claim 27, wherein the service guide includes at least one of the content information and the schedule information.

29. The interactive broadcasting service providing apparatus of claim 27, wherein the terminal requests contents selected by a user through the service guide to the MBS controller.

30. An interactive broadcasting service providing method of a content provider in a wireless system, the method comprising:
generating Multicast and Broadcast Service (MBS) contents; and
transmitting content attributes, including terminal interaction request time index information relating to the generated contents, to an MBS controller;
wherein the terminal interaction request time index information indicates a terminal interaction request time for sending a burst allocation request message to a Base Station (BS) and requesting terminal interaction for corresponding contents;
wherein content information or schedule information is generated and transmitted to a terminal by the MBS controller using the terminal interaction request time index information received from the content provider.

31. The interactive broadcasting service providing method of claim 30, wherein the content attributes include at least one of content encoding information, a file size, content provider information, and the terminal interaction request time index.

32. The interactive broadcasting service providing method of claim 30, further comprising:
when receiving a content transfer ACKnowledge (ACK) message from the MBS controller, transmitting the generated contents to the MBS controller.

* * * * *